(12) United States Patent
Amini et al.

(10) Patent No.: US 10,349,423 B2
(45) Date of Patent: Jul. 9, 2019

(54) AUTOMATIC WIRELESS NETWORK CHANNEL SELECTION

(71) Applicant: NETGEAR, INC., San Jose, CA (US)

(72) Inventors: Peiman Amini, Mountain View, CA (US); Joseph Amalan Arul Emmanuel, Cupertino, CA (US)

(73) Assignee: NETGEAR, INC., San Jose, CA (US)

(*) Notice: Subject to any disclaimer, the term of this patent is extended or adjusted under 35 U.S.C. 154(b) by 40 days.

(21) Appl. No.: 15/693,383

(22) Filed: Aug. 31, 2017

(65) Prior Publication Data

US 2017/0367102 A1 Dec. 21, 2017

Related U.S. Application Data

(63) Continuation of application No. 14/562,493, filed on Dec. 5, 2014, now Pat. No. 9,775,164.

(60) Provisional application No. 61/932,724, filed on Jan. 28, 2014.

(51) Int. Cl.
*H04W 72/08* (2009.01)
*H04W 52/02* (2009.01)
*H04W 16/10* (2009.01)
*H04W 84/12* (2009.01)
*H04W 72/04* (2009.01)

(52) U.S. Cl.
CPC ......... *H04W 72/082* (2013.01); *H04W 16/10* (2013.01); *H04W 52/0212* (2013.01); *H04W 72/0453* (2013.01); *H04W 84/12* (2013.01); *Y02D 70/142* (2018.01); *Y02D 70/144* (2018.01); *Y02D 70/162* (2018.01); *Y02D 70/166* (2018.01); *Y02D 70/26* (2018.01)

(58) Field of Classification Search
CPC combination set(s) only.
See application file for complete search history.

(56) References Cited

U.S. PATENT DOCUMENTS

| 5,418,839 | A | * | 5/1995 | Knuth | H04M 1/72511 455/464 |
|---|---|---|---|---|---|
| 2003/0064744 | A1 | | 4/2003 | Zhang et al. | |
| 2003/0206130 | A1 | * | 11/2003 | Husted | G01S 7/021 342/57 |
| 2004/0017794 | A1 | * | 1/2004 | Trachewsky | H04W 48/20 370/338 |
| 2005/0124335 | A1 | * | 6/2005 | Cave | H04W 16/10 455/422.1 |
| 2005/0226269 | A1 | * | 10/2005 | Seo | H04W 72/02 370/465 |

(Continued)

FOREIGN PATENT DOCUMENTS

| CN | 102137480 A | 7/2011 |
|---|---|---|
| CN | 102457940 A | 5/2012 |

*Primary Examiner* — John D Blanton
(74) *Attorney, Agent, or Firm* — Perkins Coie LLP

(57) ABSTRACT

A method for selecting signal channel for a wireless networking device is provided. The method collects WLAN and non-WLAN interference information on the candidate channels. The method then determines a weighted grade for each of the candidate channels based on the collected WLAN and non-WLAN interference information. A channel is selected among the candidate channels based on the weighted grades. The method further adjusts WLAN transmit parameter of the wireless networking device based on the collected WLAN and non-WLAN interference information.

23 Claims, 16 Drawing Sheets

(56) References Cited

U.S. PATENT DOCUMENTS

| | | |
|---|---|---|
| 2006/0121929 A1 | 6/2006 | Cave et al. |
| 2010/0062717 A1 | 3/2010 | Brisebois et al. |
| 2010/0238871 A1* | 9/2010 | Tosic .................. H04W 16/10 370/329 |
| 2011/0096739 A1* | 4/2011 | Heidari ............... H04W 72/085 370/329 |
| 2011/0110449 A1 | 5/2011 | Ramprashad et al. |
| 2012/0002567 A1* | 1/2012 | Sun ..................... H04W 28/16 370/252 |
| 2012/0184327 A1 | 7/2012 | Love et al. |
| 2014/0036787 A1* | 2/2014 | Ganu ................... H04W 16/10 370/329 |
| 2015/0043409 A1* | 2/2015 | Choi .................. H04W 52/0216 370/311 |
| 2015/0117186 A1 | 4/2015 | Uchida |
| 2015/0341871 A1* | 11/2015 | Bader .................. H04W 52/46 370/238 |

* cited by examiner

| Channel Identifier | Center Frequency | FCC (America) | ESTI (EMEA) | TELEC (Japan) | MOC (Israel Outdoor) |
|---|---|---|---|---|---|
| 1 | 2412 | X | X | X | |
| 2 | 2417 | X | X | X | |
| 3 | 2422 | X | X | X | |
| 4 | 2427 | X | X | X | |
| 5 | 2432 | X | X | X | X |
| 6 | 2437 | X | X | X | X |
| 7 | 2442 | X | X | X | X |
| 8 | 2447 | X | X | X | X |
| 9 | 2452 | X | X | X | X |
| 10 | 2457 | X | X | X | X |
| 11 | 2462 | X | X | X | X |
| 12 | 2467 | | X | X | X |
| 13 | 2472 | | X | X | X |
| 14[2] | 2484 | | | X | |

*FIG. 1*

| Parameter | Description |
|---|---|
| TX power on differed channels | Power may vary due to regulatory and HW. For example in north America, channel 1 and 11 may have lower power due to being band edge channels. |
| Spectral Mask of interfering APs | The effect of a nominal BSS on the neighboring BSS on adjacent channels can be characterized in frequency domain using the spectral mask as defined in 802.11 specification. |
| WLAN activity (number of APs | The number of APs on different channels are calculated using deep scan. The percentage of activity on channel may also be measured. |
| Non-WLAN | The non wlan interference such as baby monitors, microwave oven, and others are measured using noise and spectral analysis. |
| All 2.4G channels | All the 2.4G channels are include in our optimization as opposed to only channel 1, 6, and 11. |
| Board Interference | Interference from known components or I/O on the board is taken into account. e.g. USB 3.0 |

*FIG. 2*

Test Results for the 2.4G algorithm

| Experiment index | Channel Picked | | | TPUT numbers in Mbps | | |
|---|---|---|---|---|---|---|
| | NTGR ACS1 | NTGR ACS2 | Legacy ACS | NTGR ACS1 | NTGR ACS2 | Legacy ACS |
| 1 | 9 | 8 | 11 | 7.36 | 6.57 | 0 |
| 2 | 4 | 9 | 11 | 2.43 | 2.89 | 0 DC |
| 3 | 8 | 9 | 11 | 6.24 | 3.86 | 0 DC |
| 4 | 9 | 9 | 6 | 4.18 | 9.5 | 0.2 |
| 5 | 9 | 8 | 11 | 3.57 | 6.62 | 0 |
| 6 | 8 | 8 | 11 | 6.06 | 8.3 | 0 DC |
| 7 | 8 | 9 | 11 | 6.9 | 4.4 | 0.06 DC |
| 8 | 8 | 8 | 11 | 5.8 | 7.2 | 0.3 |
| 9 | 8 | 9 | 11 | 6.1 | 7.4 | 0 DC |
| 10 | 9 | 8 | 11 | 5.1 | 7.2 | 0 DC |

*FIG. 8*

AUTOMATIC WIRELESS NETWORK CHANNEL SELECTION

CROSS REFERENCE TO RELATED APPLICATIONS

This application is a continuation of U.S. patent application Ser. No. 14/562,493, filed on Dec. 5, 2014, entitled "AUTOMATIC WIRELESS NETWORK CHANNEL SELECTION", which claims priority to provisional U.S. Provisional Patent Application No. 61/932,724, filed Jan. 28, 2014, which are incorporated herein by reference in their entirety.

TECHNICAL FIELD

The invention relates to wireless networking technologies. More particularly, the invention concerns a wireless networking device with a smart channel selection capability.

BACKGROUND

Radio communications are widely used in areas including sound signal transmission, video signal transmission, and data transmission. In various radio communication technology areas, radio receivers are used to receive radio waves intercepted by antennas and to convert the information carried by the radio waves into usable forms. Through a demodulation process, a radio receiver converts the information into sound signals, video signals, data, or other useful signals. Devices that contain radio receivers include, e.g., cell phones, wireless network devices, Bluetooth devices, etc.

For industrial, scientific, medical and other purposes, various radio frequency devices transmit and receive radio frequency signals at radio bands, which are collectively labeled the industrial, scientific and medical (ISM) radio bands. Generally, the ISM radio bands are internationally reserved for civil usages. In recent years, these ISM bands have become particularly popular among short-range, low power communications systems. For example, the 2.4 GHz band is used by communications of cordless phones, Bluetooth devices, near field communication (NFC) devices, ZigBee devices, radio control toys, and wireless network devices. Because there are many different usages of the ISM bands, the emissions of the devices operating at the ISM bands can create electromagnetic interferences and disrupt the radio communications of other devices at the same or nearby frequency. Thus, the communication devices operating at the ISM bands need to tolerate the interferences generated by other devices operating at the same or nearby bands.

In addition, there are interferences between wireless local area networks (WLANs). The number of wireless LANs deployed increases every year. Both corporate entities and private families deploy wireless LANs. In some occasions, there is no coordination between the wireless LAN networks during the planning and deployment stages. Therefore, devices within a wireless LAN network can have interferences generated by devices of other wireless LAN networks. The interference problem becomes even more prominent when the network devices have better signal ranges.

SUMMARY

According to at least one embodiment, disclosed herein is a wireless access point device that can manage the interference issue by automatic channel selection. One of the roles of channel selection is to avoid interference from other equipment when needed. Embodiments of the invention also concern parameters other than interference, such maximum TX power, etc. In embodiments of the invention that provide for operation in multiple bands in a common device having, for example, separate modules for each band, interference between modules on the device is characterized and taken into account when selecting the channel. Double data rate (DDR) noise, USB 3.0 noise, Bluetooth, and Zigbee are among sources of interference which are carefully considered.

BRIEF DESCRIPTION OF THE DRAWINGS

FIG. 1 is a table that shows WLAN channels in the 2.4G band;

FIG. 2 is a table showing parameters of an example channel selection algorithm;

FIG. 8 illustrates a table showing the test results obtained with the 2.4G algorithm;

DETAILED DESCRIPTION

Figure 3:
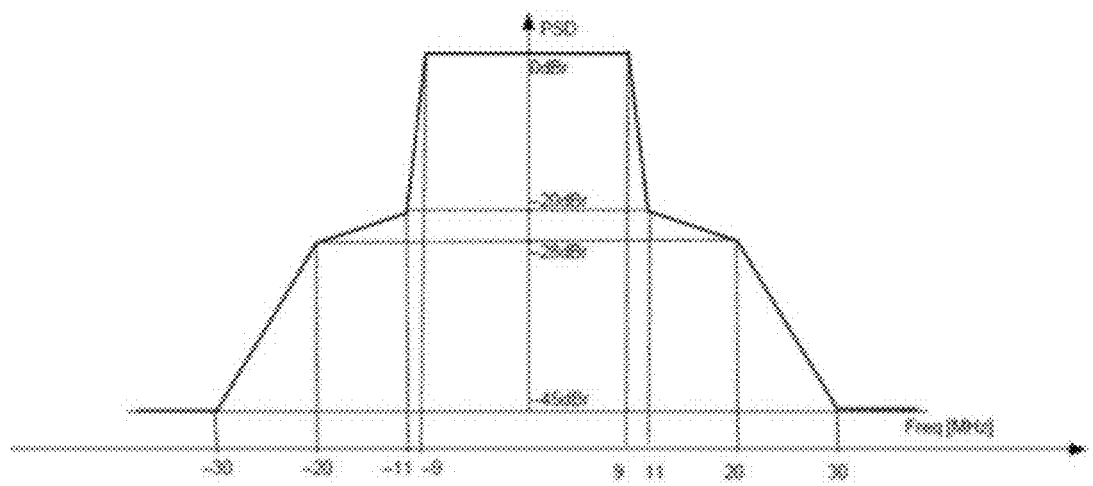
FIG. 3 shows a transmit spectral mask for 20 MHz transmission in the 2.4 GHz band.

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

Embodiments of the invention provide several mechanisms to select the best channel or best channels on various devices in a WLAN environment and adjust the relevant transmit and receive parameters accordingly. The device may be an access point, residential gateway, repeater, soft access point, hotspot, etc. The device may be active in one band at a time. The device may be active in two or more bands simultaneously (including 2.4G, 5G, Sub1G, 60G, etc.). The channel selection may choose channel for each band independently, or it may have a joint optimization criteria to pick channels on all bands. The device may have more than one active channel for one or more bands.

The device can be various types of networking devices. If the device is a router, there is one channel for each band that the router supports. Two or more channels are provided for each band for routers that support more than one channel in each band. Embodiments of the invention take interference from the other channels in each band into account. If the device is a repeater, the backhaul channel and forward channel are picked together. Information is fed to the access point (AP) for best channel selection on the AP. If the device is a sensor gateway, the backhaul channel and forward channel are picked together based on the power and latency requirement of sensors, in addition to other parameters. Power consumption may be reduced by adjusting parameters inside the wireless chip or by adjusting parameters in the frontend modules, such as the power amplifier.

FIG. 1 is a table that shows WLAN channels in the 2.4G band. WLAN devices use frequency bands for wireless communications which are known as the Industrial Scientific Medical (ISM) bands. In the United States, the ISM bands are defined by the Federal Communications Commission or FCC such as 900 MHZ, 2.4 GHz and 5 GHz, and a license is not required to operate in ISM band bands. Therefore, it is possible to build a broad range of wireless radios that can be operated in these frequency bands. One of the roles of channel selection is to avoid interference from other equipment when needed. Embodiments of the invention concern parameters other than interference, such maximum transmit power, etc. In a multi-band device having multiple modules on a common circuit board interference from other modules on the board is characterized and taken into account when selecting the channel. DDR noise, USB 3.0 noise, Bluetooth, and Zigbee are among source of interference which should be carefully considered.

FIG. 2 is a table showing parameters of an example channel selection algorithm. In embodiments of the invention, a grade is calculated for each channel. Based on the grades the preferred channel(s) are selected. The grade is calculated for overlapping and non-overlapping channels. For each WLAN overlapping basic service set (OBSS), a negative grade can be added based on the magnitude of the overlapping part of the spectrum mask of the OBSS. If the overlapping part of the mask is smaller than a threshold, no negative grade is added. Proportion to the level of the noise, a negative grade can be added as well. If noise is above a certain threshold, the channel may not be used. A positive grade can be added base on the maximum transmit power in each channel.

The major interferers and detected and avoided. Interfering equipment in the vicinity of the 802.11 device is detected, based on the pulse shape in the time domain or frequency domain or other signatures in the interfering signal. In some embodiments of the invention, if continuous wave interferers, e.g. a baby monitor, or packetize interferers, e.g. non Wi-Fi digital systems such as Bluetooth, etc., are detected, the channels which are close to the interferes may be avoided when possible.

Embodiments of the invention pick overlapping and non-overlapping channels in the 2.4G band from 1, 2, 3, . . . , XX-1, XX based on the different parameters. XX is the number of channels in 2.4G and it changes from country to country, e.g. 11 in North America, 13 in Japan. Different parameters, including the following, are taken into account:

WLAN activity, e.g. number of APs, how busy they are, etc.;

Spectral mask of WLAN signals;

Transmit power level on different channels;

Power variance due to regulatory and hardware limitations; and

Non-WLAN activity, e.g. baby monitor, microwave, etc. Embodiments of the invention combine all of the above in the 2.4G channel optimization and pick the best channel. In some embodiments of the invention, when the device is using more than one channel in 2.4G band, the automatic channel selection device (ACSD) may pick two channels instead of one channel.

Figure 4:
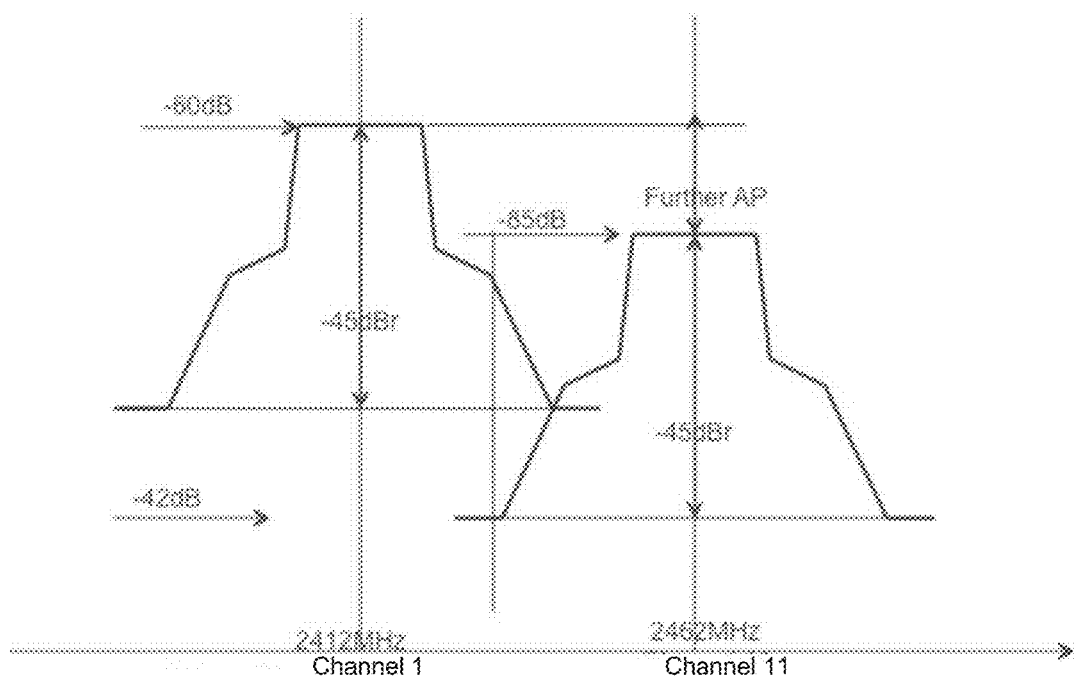
FIG. 4 shows the effect of two interfering APs in frequency domain.

FIG. 3 shows a transmit spectral mask for 20 MHz transmission in the 2.4 GHz band. The adverse effect of an overlapping BSS on the channel it is active at and on the neighboring channels is taken into account based on a nominal WLAN spectral mask. The maximum interference from an adjacent OBSS is on the channels it is active at and it drops on the neighboring channels. FIG. 4 shows the effect of two interfering APs in frequency domain, between channel 1 (2412 MHz) and channel 11 (2462 MHz). As can be seen in the figure, the adverse effect adds up.

Figure 5:
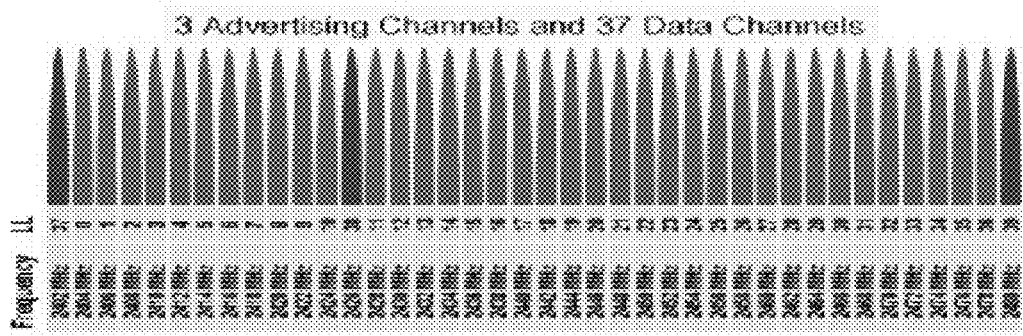
FIG. 5 shows Bluetooth interference to 2.4G Wi-Fi.

There are also non-WLAN sources of interferences. Non-WLAN sources of interference in the 2.4G band can include microwave ovens, baby monitors, cordless phones (some older devices can emit signal over the entire 2.4 GHz band), Bluetooth headsets or devices, intercom systems, USB 3 components, etc. In some embodiments, WiFi-Bluetooth coexistence mechanisms may be improved such that the Wi-Fi module picks the best channel in 2.4G in terms of minimal interference or it moves to another band if possible. For example, FIG. 5 illustrates the advertising channels and data channels in 2.4G.

Figure 6:
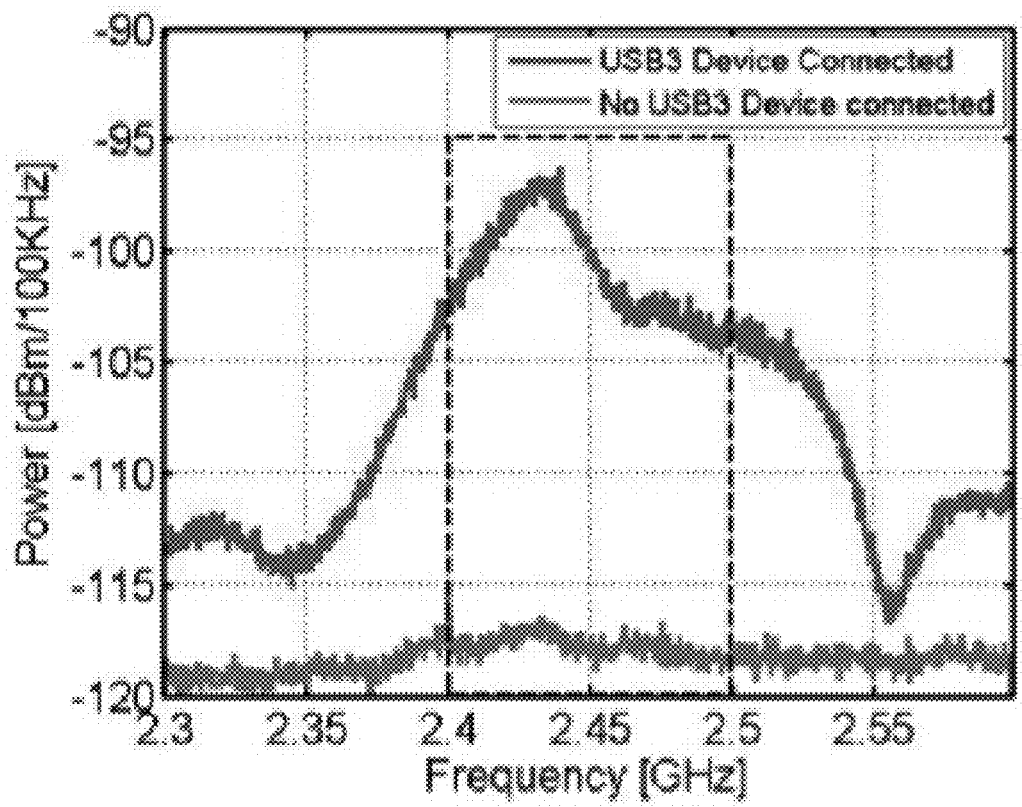
FIG. 6 shows USB 3 interference to 2.4G.

USB 3.0 can also create interference in 2.4G band. The adverse effect can be characterized and the adverse received effect is taken into account when picking the channel and band of operation. FIG. 6 illustrates a difference of the power spectrum with and without a USB 3 device connected.

Figure 7:
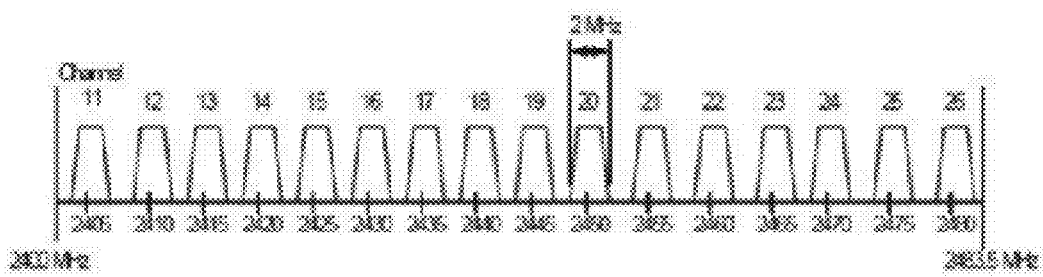
FIG. 7 shows 2.4G Zigbee channeling.

2.4G Zigbee signals can also overlaps with Wi-Fi. Thus, collaboration between the software stack for each of them helps provide better performance for both types of signals. The ACS on Wi-Fi side can convey the information to the Zigbee module so that Zigbee avoids Wi-Fi by moving to a sub-1G band; and/or by avoiding the Wi-Fi channel in 2.4G band. Thus, Wi-Fi can try to pick a channel that minimizes interference with a current mode of operation of the Zigbee module. FIG. 7 illustrates bands between 2400 MHz and 2483.5 MHz.

FIG. 8 illustrates a table showing the test results obtained with the herein disclosed 2.4G algorithm.

Figure 9:
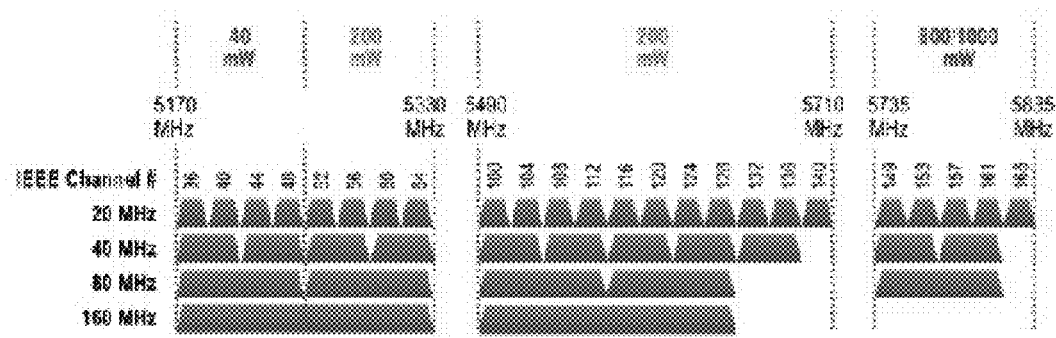
FIG. 9 shows 5G channels in the US.
Figure 10:
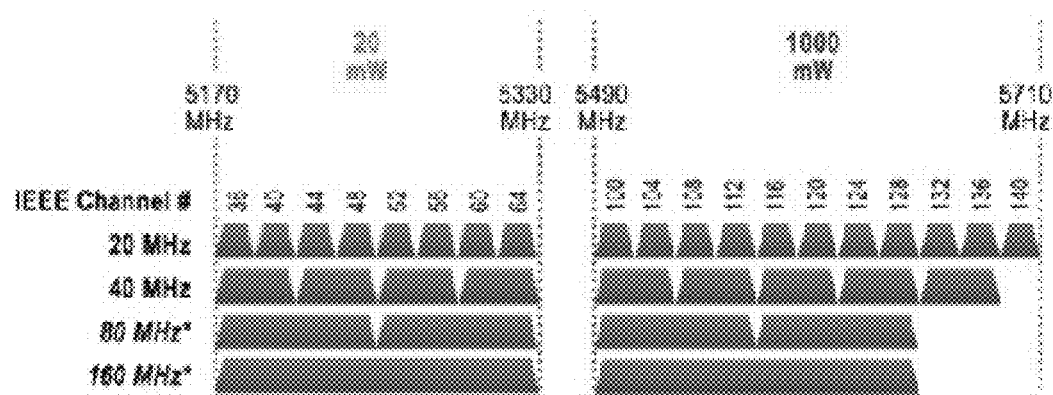
FIG. 10 shows 5G channels in the EU.

For a router in the FCC locale (e.g. U.S.), higher power channels in high 5G (5735 MHz to 5835 MHz) may be given preference if the noise and interference activity is not above a certain threshold. FIG. 9 illustrates U.S. 5G bands with different band widths and allowed powers. For a router in the ETSI locale (e.g., Europe), higher power channels in 5490 to 5710 may be given preference if the noise and interference activity is not above a certain threshold. FIG. 10 illustrates European 5G bands with different band widths and allowed powers.

The algorithm can further determine selection between 40 MHz and 80 MHz Channels. When a 40 MHz or 80 MHz channel is being picked by the ACS, the WLAN and non-WLAN activity in all 20 MHz sub-channels can be monitored. The capability of the receiver to receive on a primary 20 MHz or primary 40 MHz signal when interference is present on the secondary channels can be taken into account. If the receiver is not functioning well when interference is present in the secondary channels, an attempt can be made to align the interference with the primary channels. If it is not possible to align the interference with the primary channels, a different 40 MHz or 80 MHz channel can be tried and, if that is not possible, a narrower channel can be used. If the receiver can work well with secondary interference, the weight at which the secondary interference is negatively affecting the selection can be reduced.

In some embodiments, the algorithm can avoid aligning the interference with primary channels. This can happen when hardware function well with interference on secondary channels. In other words, some hardware perform well when transmission and reception are happening on primary and there is interference on one of the secondary channels. On those hardware platforms, interference may be aligned with secondary. Alternatively, the bandwidth can be adjusted from 80 to 40 MHz, or from 80 to 20 MHz.

In some embodiments, the PA has adjustable parameters. The channel selection algorithm may adjust parameters for the power amplifier (PA) that affect transmit power, linearity, and efficiency. Cell radius is affected. Power consumption may also be affected. Heat dissipation may also be affected. The channel selection algorithm may take into account the flexibility of the PA when it picks the channel. Different bias currents or a different supply voltage can result in different transmit power, a different result in terms of link balancing, changing the efficiency, and power saving.

If ACS determines a densely populated area like an apartment by seeing many access point close by. The transmit power can be dropped such that cell radius becomes smaller. This will help the AP by getting less undesired probe requests from clients in neighbors home. It also helps neighbors home by reducing the effective interference range from AP to them.

If the AP sees very clean environment and small number of APS with low RSSI, it may increase the transmit power. The reason is that there is not many outsider clients close by so increasing range will not attract undesired interference from other people's clients.

The algorithm considers the TX Power and PA Adjustment. The receiver power and the receiver data rate of all the associated stations (STAs) may be used to adjust the power level for all the STAs or adjust power level for each STA (referred to as Link balancing).

Based on the regulatory test results for the channel of operation, the maximum power can be determined and thus the bias current may be adjusted.

Based on the area that the AP covers the maximum transmit power and bias current may be adjusted. For example, a higher bias current may be set for a house compared to an apartment.

The operating temperature of the board may be taken into account when the PA parameters are adjusted. If the board is running hot, various parameters may be adjusted to reduce the power that is being dissipated from the PA.

If a device is battery operated, based on the state of the battery the PA power consumption and bias current may be adjusted. For example, if the battery is low, a lower bias current and/or supply voltage may be used.

Based on measured received signal strength indication (RSSI) of neighboring APs, the transmit power may be determined such that the desired cell radius is achieved. When APs are installed in a building by a network provider, the distance between the adjacent APs and adjacent APs with same channel are known. This information can be used to determine the desired transmit power and the corresponding PA parameters.

Once the ACS has selected the channel, based on the information that it has collected from the channel it has selected and other channels, the ACS may pass the collected information to the wireless driver or other software to adjust Layer 1 and/or Layer 2 parameters. Such information can include, for example, radio RX gain table and radio TX gain table. The radio RX gain table can be used to minimize the effect of interference and noise from the neighboring channels and the selected channel. The radio TX gain table can be used to minimize TX power consumption, as well as to optimize the performance that can be achieved in the current state of channel.

Receive processing threshold can be adjusted to be less sensitive to noise when the environment is noisy.

If ACS determines a densely populated area like an apartment by seeing many access point close by. The effective receiver range may be dropped such that cell radius becomes smaller. This will help the AP by receiving less undesired packets from clients and therefore backing off less to other packets.

If the AP sees very clean environment and small number of APS with low RSSI, it may increase the receive sensitivity to maximum. The reason is there is most or all clients around need to be services by this AP so the more receive range the better.

Once the channel is selected, the device may use the information that is collected by ACS to determine how much noise and interference is on the channel which is selected or close to the channel that is selected. Based on the noise and interference on the channel that is selected or neighboring channels, different radio settings may be modified to achieve the best receiver performance.

RX settings are modified to avoid non linearity's in radio and to limit the performance degradation due to noise. For example, if channel 8 is selected and there is another strong AP on channel 1, the radio settings may be modified to receive channel 8 signal while not getting saturated by channel 1 signal. If there is noise on channel 8 which is selected, setting may be applied such that the effect of noise is mitigated to a best possible option such that the noise does not make receiver performance too bad.

Media Access Control (MAC) energy detect parameter can be increased in a noisy environment. The parameter can also be adjusted based on the RSSI of neighboring APs. The enhanced distributed channel access (EDCA) can back off parameters, and the inter frame space (IFS), minimum contention window (CWMin), and maximum contention window (CWMax) may be adjusted. Also, the MAC may be more aggressive to get on channel when needed. In some embodiments, one may adjust the MAC parameters in a less aggressive way when there is not much data and delay is not important. For example if the AP is used to collect sensor data which will need update once a day only, the choice of the MAC parameters does not need to be aggressive.

Depending on which device is the receiver of the packet, what source of interference is being seen, what is transmit power can be used, and how the link is balanced, rate selection parameters used when transmitting packets may be modified.

In some embodiments, the channel selection can be done when there is more than one radio in each band. There may be routers which are active in more than one band at the same time, e.g. a sensor gateway which has a dedicated channel for sensors. Channel selection may pick more than one channel for such a device. Different parameters may be used for the selection of the channels. Minimum interference may be important for some applications, while for other applications the maximum range may matter.

A low power sensor gateway may choose to pick a channel which optimizes the power consumption of the sensors. The power consumption may be optimized at a channel with minimal interference, at a channel where link is balanced. Transmit power is maximized and receiver performance is maximized. The best channel for some sensors is where the delay is minimized and the jitter is minimized.

A repeater may have only one channel on which it talks to the AP and client. In this scenario, the AP may take into account the information from the repeater when it picks the channel. The information from the repeater includes interference, noise, transmit power, etc. The repeater has a channel on which it talks to the AP and another channel where it talks to clients. Other than optimization criteria used for channel selection, the repeater uses its own channel while taking into account any interference with the activity of the channel where the AP is functioning.

Figure 11:
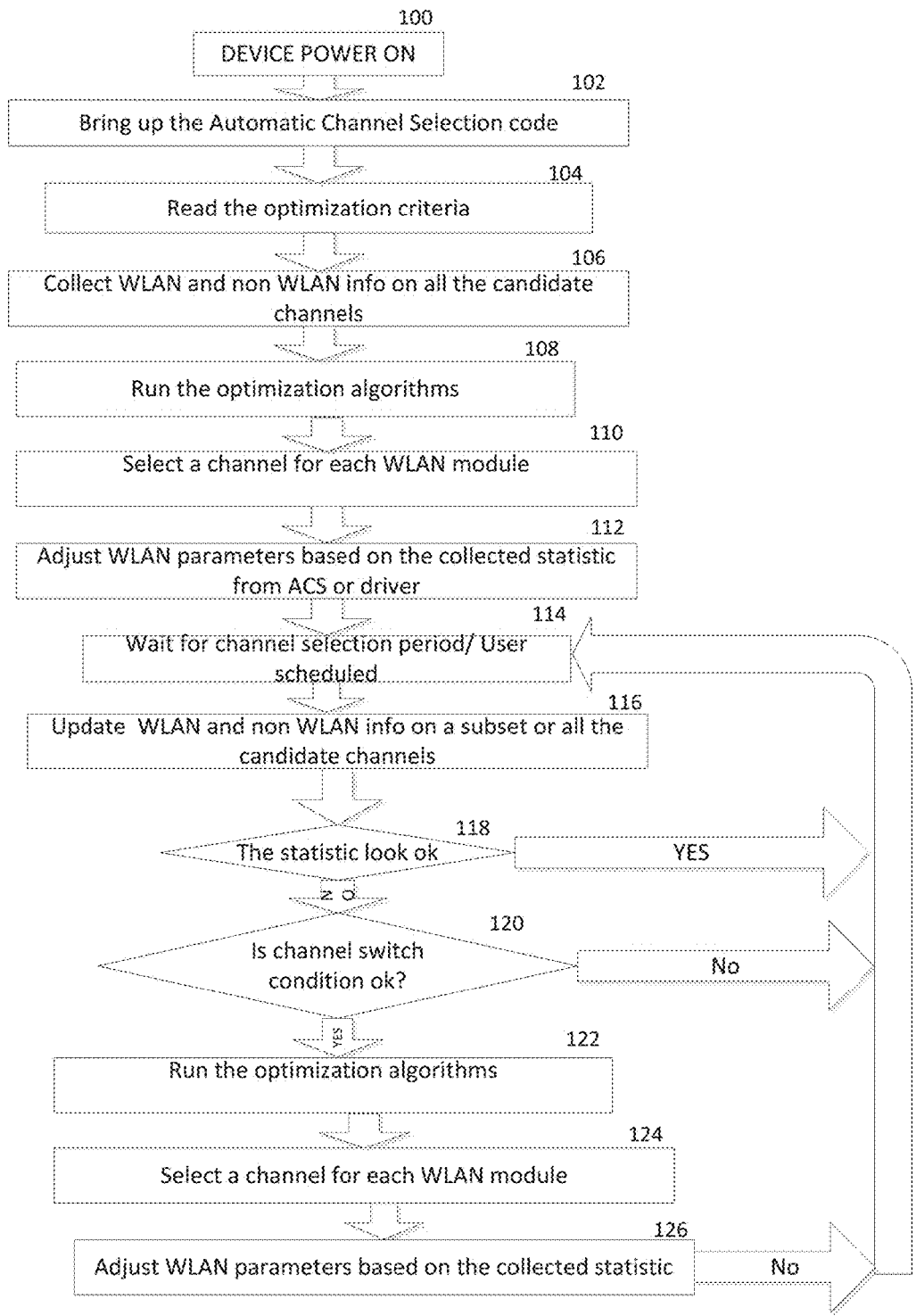
FIG. 11 shows an overall flowchart for channel selection according to the invention.

FIG. 11 shows an overall flowchart for channel selection according to the invention. In FIG. 11, a device is powered on (100) and an automatic channel selection code is brought up (102). The channel selection code can be, e.g., part of the firmware of the device or a program stored in the device. The optimization criteria are read (104). The optimization criteria can simply be avoiding some channel because of the environment information. In some situation, the administrator can specify whether in this environment the device transmits the highest power that it is capable to transmit. The optimization criteria can includes information on whether the administrator concerns the transmit power. The optimization criteria can specify different weights to different decision criteria or even changing the decision criteria.

WLAN and non-WLAN information is collected on all candidate channels (106). For each 2.4G and/or 5G channel, the device collects the WLAN and non-WLAN information. The device can spend a particular amount of time on each channel, depending on the type of deployed environment. The amount of time can be more than 100 milliseconds, as most devices transmit beacon signal once every 100 milliseconds. In some cases, the time period can be several hundred milliseconds so that the device gets a chance to detect the WLAN and/or non-WLAN information, since in a crowded environment the beacon signals might not be transmitted on time. Some devices wait for a while before getting a chance to transmit a beacon signal.

The device can passively listen to the signals from other devices or actively sending request signals for retrieving information. For an active scan, the device sends a broadcast probe request for responses. The waiting time period can be longer with the active scan, since the devices take turns to respond in order to avoid signal collision.

The optimization algorithms are run (108). During the optimization, weight values for different factors are determined, as shows in the figures that follow. Then a channel is selected for each WLAN module (110). The channel can be selected based on the scores generated during the optimization process.

The WLAN parameters are adjusted based on statistics collected from the ACS ("automatic channel selection") and/or drivers (112). Once the device knows the sources of interference, the device can teak the receiver to be less prone to the known interference. The receiver may also know which other Aps are nearby and their approximate distances. In order to avoid letting all other nearby APs communicate with the device, the device can decrease the transmit power.

The system waits for a channel selection period or for a user scheduled channel selection interval (114). The WLAN and non-WLAN information is updated on a subset or on all of the candidate channels (116). If the statistics are acceptable (118), the system again waits for channel selection (114); else, the system determines if the channel switch condition is acceptable (120). If the condition is not acceptable (120), the system again waits for channel selection (114); else, the system runs the optimization algorithms (122) and a channel is selected for each WLAN module (124). The WLAN parameters are then adjusted based on the collected statistics (126).

Figure 12:
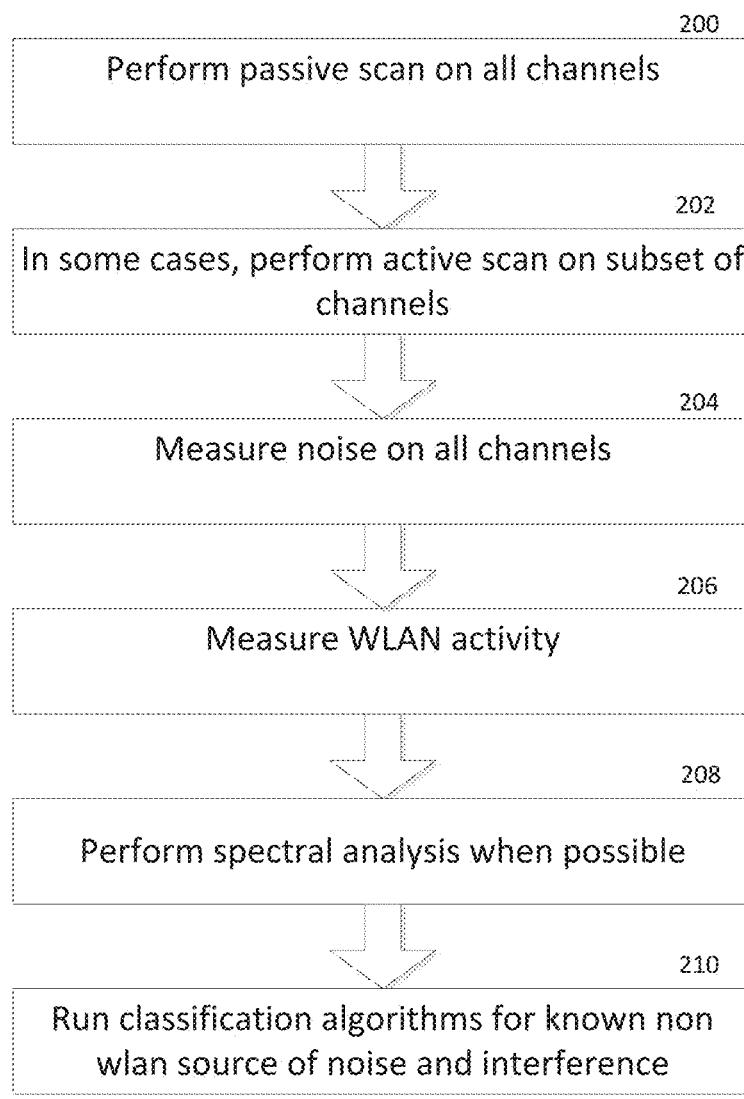
FIG. 12 shows collection of WLAN and non-WLAN information on all candidate channels according to the invention.

FIG. 12 shows a process of collection of WLAN and non-WLAN information on all candidate channels according to the invention. In FIG. 12, a passive scan is performed on all channels (200). In some case, an active scan is performed on a subset of the channels (202). In some embodiments, some of the 5G bands are radar bands, the device can avoiding actively scanning the 5G radar bands due to regulatory restrictions.

Noise is measured on all channels (204). The noise can include ambient noise from other APs or devise, or even from the board of the device itself (e.g. DDR, Ethernet, CPU, etc.). The noise also includes signals from skirts of neighboring channels, since the channels have widths. The device can even have a self-feedback mechanism, so that the status of the board components of the device is taken into account during analysis. WLAN activity is measured (206).

Spectral analysis is also performed, where possible (208). For some noise, the device may not initially determine the type of the source device. The spectral analysis can compare the shape of the signal spectrum with the known patterns and helps determining the type of the device (e.g., type of chipset). Classification algorithms are run for known non-WLAN sources of noise and interference (210).

Figure 13:
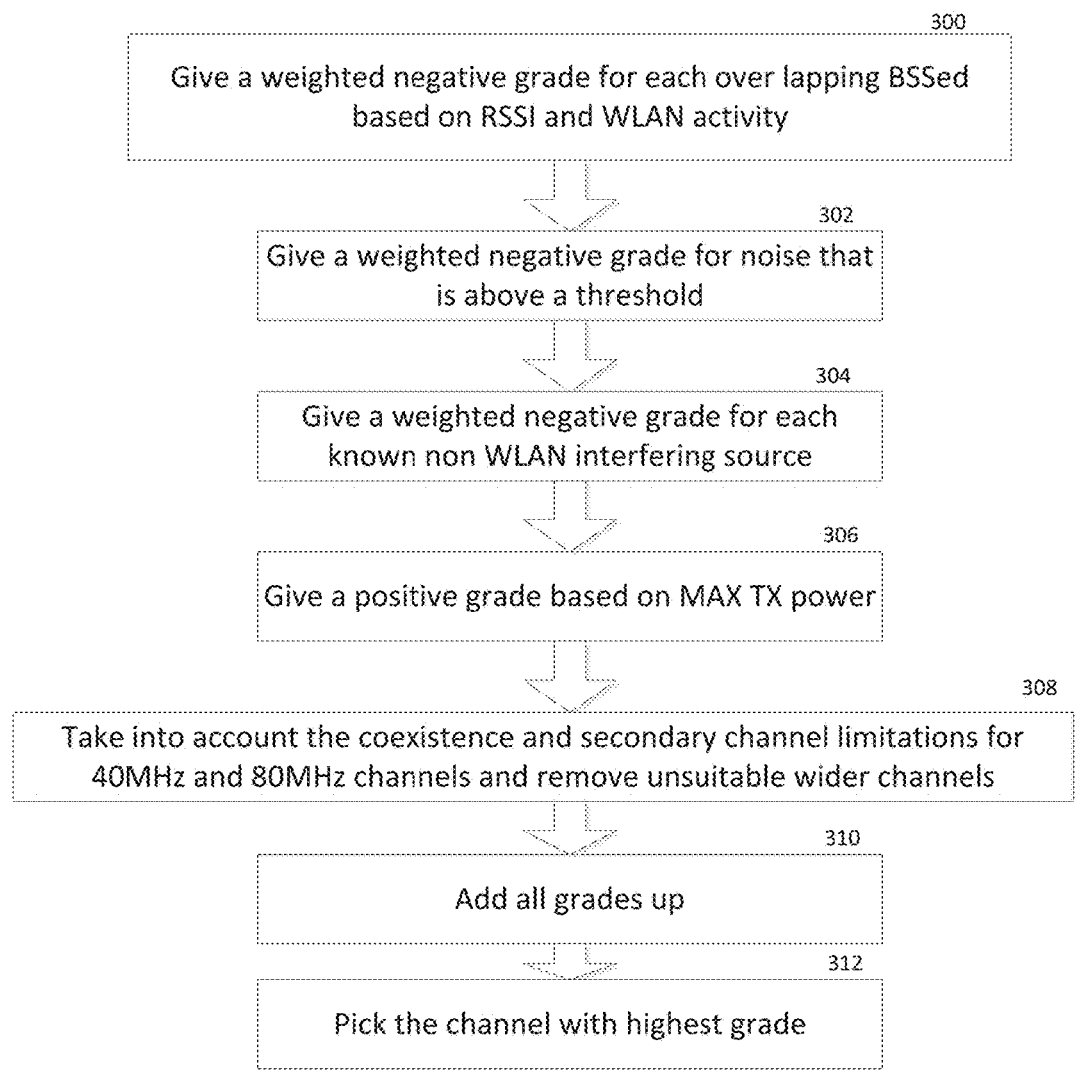
FIG. 13 shows running of the optimization algorithms according to the invention.

FIG. 13 shows a process of running of the optimization algorithms according to the invention. In FIG. 13, a weighted negative grade is given for each overlapping BSSed based on RSSI and WLAN activity (300). A weighted negative grade is also given for noise that is above a threshold (302). A weighted negative grade is also given for each known non-WLAN interfering source (304), and a positive grade is given based on maximum transmit power (306). The coexistence and secondary channel limitations of 40 MHz and 80 MHz channels is taken into consideration and unsuitable wider channels are removed (308). All grade are then added (310) and the channel having the highest grade is picked (312).

Figure 14:
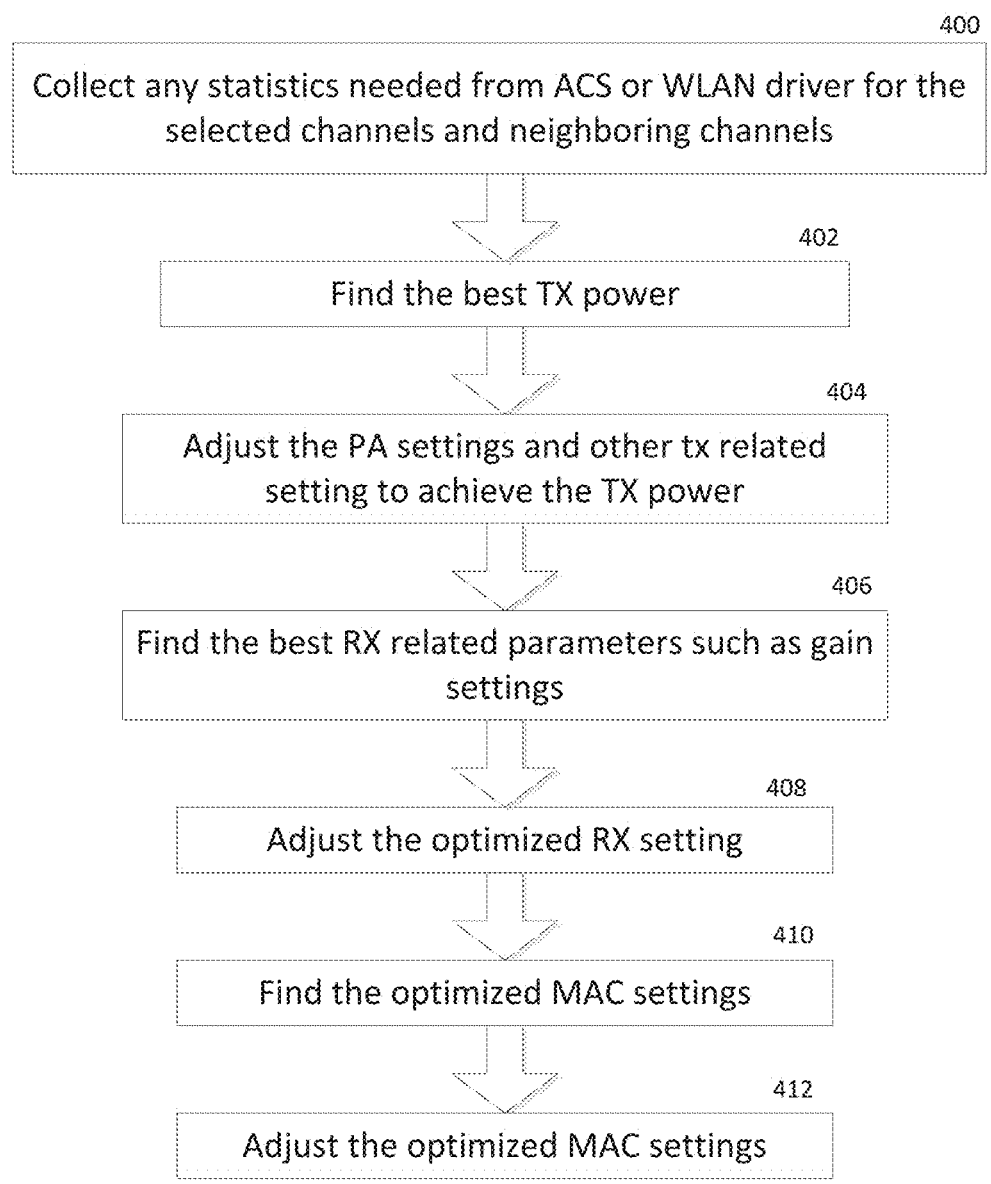
FIG. 14 shows adjusting of the WLAN parameters based on the collected statistic according to the invention.

FIG. 14 shows a process of adjusting of the WLAN parameters based on the collected statistic according to the invention. In FIG. 14, any statistics needed from the ACS or WLAN driver for the selected channels and neighboring channels is collected (400). The best transmit power is identified (402) and the power amplifier and other transmit-related settings are adjusted to achieve the transmit power (404). The best receive-related parameters, such as gain settings, are also identified (406). The optimized receive setting is adjusted (408). Finally, the optimized MAC settings are identified (410) and adjusted (412).

Figure 15:
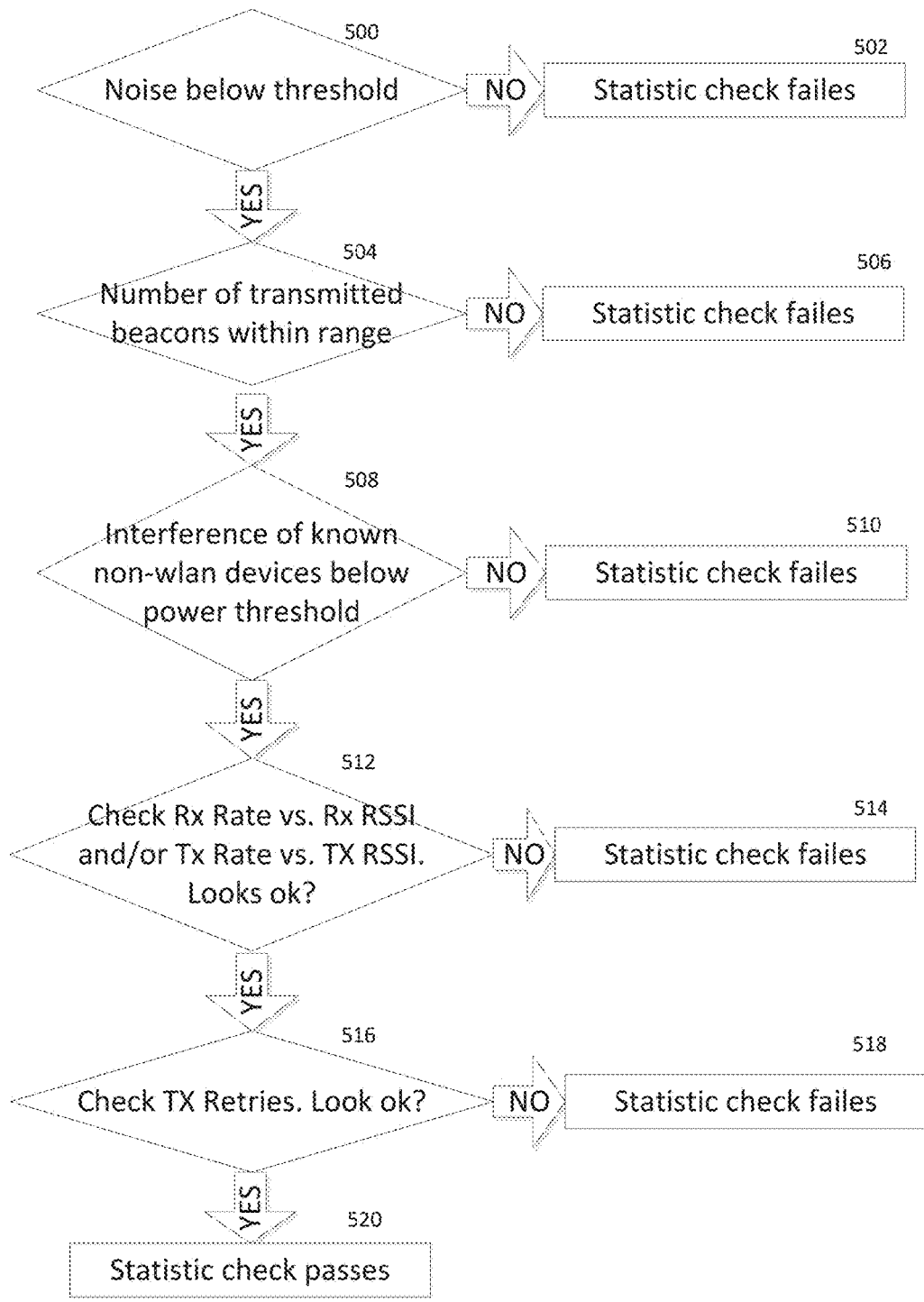
FIG. 15 shows a statistic check according to the invention.

FIG. 15 shows a statistic check according to the invention. In FIG. 15, a determination is made if the noise is below a predetermined threshold (500), if not, the statistic check fails (502); else, a determination is made if the number of transmitted beacons is within range (504). If not, the statistic check fails (506); else, a determination is made if there is interferences of known non-WLAN devices below a power threshold (508), if not, the statistic check fails (510); else, the receive rate vs. the receive RSSI and/or the transmit rate vs. the transmit RSSI is checked. If the rate is not acceptable, the statistic check fails (514); else the system checks the transmit retries (516). If the transmit retries are not acceptable, the statistic check fails (518); else the statistic check passes (520).

Figure 16:
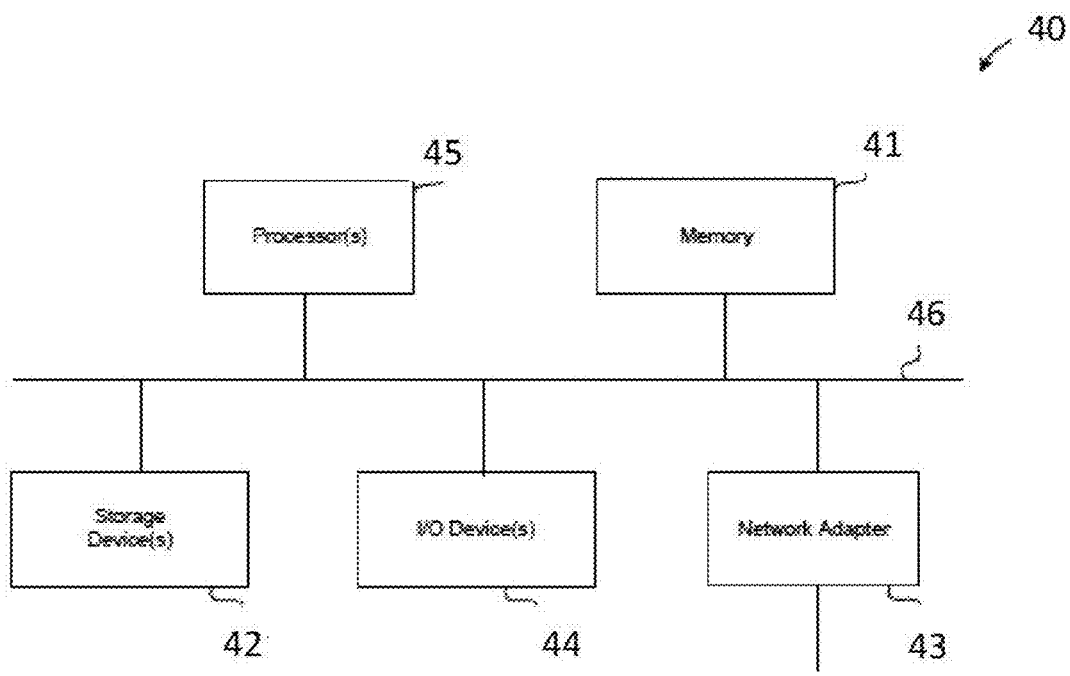
FIG. 16 is a diagrammatic representation of a machine in the example form of a computer system within which a set of instructions for causing the machine to perform one or more of the methodologies discussed herein may be executed.

FIG. 16 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 40 may include one or more central processing units ("processors") 45, memory 41, input/output devices 44, e.g. keyboard and pointing devices, touch devices, display devices, storage devices 42, e.g. disk drives, and network adapters 43, e.g. network interfaces, that are connected to an interconnect 46.

In FIG. 16, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 41 and storage devices 42 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 41 can be implemented as software and/or firmware to program one or more processors to carry out the actions described above. In some embodiments of the invention, such software or firmware may be initially provided to the processing system 40 by downloading it from a remote system through the computing system, e.g. via the network adapter 43.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in certain instances, well-known details are not described to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the invention is described herein with reference to the preferred embodiments, one skilled in the art will readily appreciate that other applications may be substituted for those set forth herein without departing from the spirit and scope of the present invention. Accordingly, the invention should only be limited by the Claims included below.

What is claimed is:

1. A method, comprising:
   collecting, by a wireless networking device, WLAN and non-WLAN interference information on a plurality of candidate channels; and
   selecting a channel among the candidate channels based on weighted grades of the candidate channels, the weighted grades being determined based on the collected WLAN and non-WLAN interference information, wherein the weighted grades include a negative component corresponding to an overlapping portion of a spectrum mask,
   wherein the determining comprises:
      assigning a weighted negative grade for each overlappingset of associated devices based on signal strength and WLAN activity;
      assigning a weighted negative grade for noise that is above a threshold value;
      assigning a weighted negative grade for a known non-WLAN interfering source;
      assigning a weighted positive grade based on the maximum transmit power of the wireless networking device; and
      calculating a summation of grades for difference factors regarding an individual channel of the candidate channels as the weighted grade for the individual channel.

2. The method of claim 1, further comprising:
   adjusting WLAN transmit parameter and/or receive parameter of the wireless networking device based on the collected WLAN and non-WLAN interference information.

3. The method of claim 1, further comprising:
   determining the weighted grades of the candidate channels based on the collected WLAN and non-WLAN interference information.

4. The method of claim 3, wherein the determining comprises any of:
   assessing coexistence and secondary channel limitations of 40 MHz and 80 MHz channels and removing unsuitable wider channels.

5. The method of claim 1, wherein the step of adjusting comprises:
   collecting statistics needed from an automatic channel selection (ACS) or WLAN driver for the selected channels and neighboring channels;
   determining that the wireless networking device is in a densely populated area that is populated by many wireless devices; and
   determining optimized value of transmit power and/or receive power of the wireless networking device that is appropriate for the densely populated area and adjusting the transmit power and/or receive power.

6. The method of claim 1, wherein the step of adjusting comprises:
   adjusting receive sensitivity parameters of the wireless networking device based on the collected WLAN and non-WLAN interference information.

7. The method of claim 1, wherein the step of adjusting comprises:
   determining optimized values of parameters that relate to signal transmission and/or reception including gain settings; and
   adjusting the gain settings for the signal transmission and/or reception based on the optimized values.

8. The method of claim 1, wherein the channel is selected among the candidate channels that includes channels in a 2.4 GHz band.

9. The method of claim 1, wherein the step of selecting further comprises:
   selecting the channel among the candidate channels based on information regarding power amplifier power consumption or bias current amplitude of the wireless networking device such that a battery consumption of the wireless networking device is optimized.

10. The method of claim 1, wherein the collected WLAN and non-WLAN interference information include a table of radio receiving gain information and/or a table of radio transmitting gain information.

11. The method of claim 1, further comprising:
    adjusting a receive process threshold of the wireless networking device after determining a noisy environment based on the collected WLAN and non-WLAN interference information.

12. The method of claim 1, further comprising:
    adjusting parameters of enhanced distributed channel access (EDCA) based on environmental noise information.

13. The method of claim 1, further comprising:
    using a classification algorithm to determine a type of a device that generates the non-WLAN interference information; and
    adjusting receiver parameters based on an output of the classification algorithm.

14. The method of claim 1, further comprising:
    performing an optimization process based on optimization criteria.

15. The method of claim 1, further comprising:
    updating WLAN and non-WLAN interference information for at least a subset of the candidate channels.

16. The method of claim 15, further comprising:
    determine whether statistics of device interface is above a threshold value and whether a channel switch condition is proper;
    performing another optimization process; and
    selecting a channel among the candidate channels based on newly determined weighted grades.

17. The method of claim 1, wherein the collecting further comprises:
    passively scanning any of the candidate channels;
    actively scanning any of the candidate channels;
    measuring noise levels on the candidate channels;
    measuring WLAN activities on the candidate channels;
    performing spectral analysis on a noise signal on one of the candidate channels;
    performing classification process for known non-WLAN source of noise and interference; or
    a combination thereof.

18. A wireless networking device, comprising;
    a radio receiver to collect WLAN and non-WLAN interference information on the candidate channels;
    one or more processors to select a channel among the candidate channels based on weighted grades of the candidate channels, the weighted grades being determined based on the collected WLAN and non-WLAN interference information, wherein the weighted grades include a negative component corresponding to an overlapping portion of a spectrum mask,
wherein the determining of the weighted grades comprises:
assigning a weighted negative grade for each overlapping set of associated devices based on signal strength and WLAN activity;
assigning a weighted negative grade for noise that is above a threshold value;
assigning a weighted negative grade for a known non-WLAN interfering source;
assigning a weighted positive grade based on the maximum transmit power of the wireless networking device; and
calculating a summation of grades for difference factors regarding an individual channel of the candidate channels as the weighted grade for the individual channel.

19. The A wireless networking device of claim 18, wherein the one or more processors are configured to adjust a WLAN transmit parameter of the wireless networking device according to the selected channel.

20. The wireless networking device of claim 19, wherein adjusting the WLAN transmit parameter comprises:
collecting statistics needed from an automatic channel selection (ACS) or WLAN driver for the selected channels and neighboring channels; and
determining optimized value of transmit power of the wireless networking device and adjusting transmit power.

21. The method of claim 20, wherein the adjusting the VVLAN transmit parameter comprises:
determining optimized values of parameters that relate to signal transmission and/or signal reception including gain settings; and
adjusting the parameters based on the optimized values.

22. The method of claim 20, wherein the adjusting the WLAN transmit parameter comprises:
determining optimized values of MAC settings; and
adjusting the MAC settings based on the optimized values.

23. The method of claim 20, wherein the one or more processors are further configured to:
determine a type of an environment based on the collected WLAN and non-WLAN interference information; and
adjust receiver settings for the wireless networking device to optimize the performance of the wireless networking device in the environment.

* * * * *